United States Patent
Kim et al.

(10) Patent No.: US 9,261,762 B2
(45) Date of Patent: Feb. 16, 2016

(54) MULTI-PROJECTION SYSTEM AND METHOD COMPRISING DIRECTION-CHANGEABLE AUDIENCE SEATS

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 14/345,158

(22) PCT Filed: Oct. 29, 2013

(86) PCT No.: PCT/KR2013/009673
§ 371 (c)(1),
(2) Date: Mar. 14, 2014

(87) PCT Pub. No.: WO2014/077528
PCT Pub. Date: May 22, 2014

(65) Prior Publication Data
US 2014/0340647 A1    Nov. 20, 2014

(30) Foreign Application Priority Data
Nov. 19, 2012   (KR) .................. 10-2012-0130821

(51) Int. Cl.
*G03B 37/04*   (2006.01)
*G03B 21/16*   (2006.01)
(Continued)

(52) U.S. Cl.
CPC . *G03B 21/16* (2013.01); *A47C 1/12* (2013.01); *A47C 3/18* (2013.01); *A63J 25/00* (2013.01); *E04H 3/22* (2013.01); *G02B 27/2271* (2013.01); *G03B 21/003* (2013.01); *G03B 21/14* (2013.01); *G03B 21/206* (2013.01); *G03B 21/2053* (2013.01); *G03B 21/26* (2013.01); *G03B 21/56* (2013.01); *G03B 21/60* (2013.01); *G03B 21/608* (2013.01); *G03B 29/00* (2013.01);
(Continued)

(58) Field of Classification Search
USPC ............... 352/39, 40, 69, 70, 85; 353/30, 94; 297/1, 217.1, 344.21, 344.23, 344.24; 52/6, 8, 9, 10
See application file for complete search history.

(56) References Cited

U.S. PATENT DOCUMENTS 3,628,829 A * 12/1971 Heilig ..................... 297/217.4
4,885,878 A * 12/1989 Wuu ............................. 52/6
(Continued)

FOREIGN PATENT DOCUMENTS

EP      0315397 A1    5/1989
JP      1994205410 A  7/1994
(Continued)

OTHER PUBLICATIONS

International Search Report mailed Feb. 12, 2014 for PCT/KR2013/009673.
(Continued)

*Primary Examiner* — William C Dowling
(74) *Attorney, Agent, or Firm* — Hauptman Ham, LLP (57) ABSTRACT

The present invention provides a multi-projection system and method including direction-changeable audience seats, and the multi-projection system includes a plurality of projection surfaces installed in a single theater; and an audience seat whose direction is changed depending on images projected on the plurality of projection surfaces.

14 Claims, 6 Drawing Sheets

| (51) | Int. Cl. | |
|---|---|---|
| | *E04H 3/22* | (2006.01) |
| | *G03B 21/56* | (2006.01) |
| | *H04N 9/31* | (2006.01) |
| | *G02B 27/22* | (2006.01) |
| | *G03B 21/26* | (2006.01) |
| | *G03B 21/608* | (2014.01) |
| | *G03B 21/14* | (2006.01) |
| | *A47C 1/12* | (2006.01) |
| | *A47C 3/18* | (2006.01) |
| | *A63J 25/00* | (2009.01) |
| | *G03B 29/00* | (2006.01) |
| | *G03B 41/00* | (2006.01) |
| | *G03B 21/00* | (2006.01) |
| | *G03B 31/00* | (2006.01) |
| | *G03B 21/20* | (2006.01) |
| | *G03B 21/60* | (2014.01) |
| | *A63J 5/00* | (2006.01) |

(52) U.S. Cl.
CPC ............... *G03B 31/00* (2013.01); *G03B 41/00* (2013.01); *H04N 9/3147* (2013.01); *H04N 9/3182* (2013.01); *H04N 9/3185* (2013.01); *H04N 9/3194* (2013.01); *A63J 2005/002* (2013.01); *G03B 37/04* (2013.01)

(56) References Cited

U.S. PATENT DOCUMENTS

| | | | | |
|---|---|---|---|---|
| 4,962,420 | A | | 10/1990 | Judenich |
| 5,601,353 | A | * | 2/1997 | Naimark et al. ............... 353/122 |
| 5,765,314 | A | * | 6/1998 | Giglio et al. ..................... 52/7 |
| 5,853,330 | A | | 12/1998 | Engstrand |
| 5,964,064 | A | * | 10/1999 | Goddard et al. ..................... 52/8 |
| 6,201,516 | B1 | * | 3/2001 | Tanide et al. ...................... 345/7 |
| 8,804,093 | B2 | * | 8/2014 | Haight et al. ...................... 352/3 |
| 2006/0028542 | A1 | | 2/2006 | Rondinelli et al. |
| 2007/0159606 | A1 | * | 7/2007 | Striedl ............................. 353/94 |
| 2007/0193123 | A1 | * | 8/2007 | Magpuri ............................... 52/8 |

FOREIGN PATENT DOCUMENTS

| | | |
|---|---|---|
| JP | 2000122193 A | 4/2000 |
| JP | 2004097243 A | 4/2004 |
| JP | 2004328321 A | 11/2004 |
| KR | 2003629230000 | 9/2004 |
| KR | 200383828 | 5/2005 |
| KR | 101154143 B1 | 5/2012 |
| KR | 1020120055110 A | 5/2012 |

OTHER PUBLICATIONS

Korean Office Action for application No. 10-2012-0130821, dated Dec. 16, 2013.
European Search Report and Written Opinion for corresponding European Patent Application No. 13854425.9 received on Sep. 30, 2015.

* cited by examiner

MULTI-PROJECTION SYSTEM AND METHOD COMPRISING DIRECTION-CHANGEABLE AUDIENCE SEATS

TECHNICAL FIELD

The present invention relates to a multi-projection system and method and, more particularly, to a multi-projection system and method comprising direction-changeable audience seats, which can change the direction of audience seats depending on a change in multi-projection images projected on a plurality of projection surfaces, thus maximizing the three-dimensional effect and immersion that audiences feel.

BACKGROUND ART

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing audiences with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, while these 3D technologies can provide audiences with 3D images, the audiences just watch the images reproduced on a single screen, which may reduce the degree of involvement in the images. Moreover, the direction of the 3D effect that the audiences feel is limited to the direction of the single screen.

Furthermore, according to the conventional 3D technologies, the audiences must wear the glasses equipped with polarizing filters during watching, which may make the audiences feel inconvenient, and different images are artificially presented to the left and right eyes, which may make some sensitive audiences feel dizzy or nausea.

Therefore, a so-called "multi-projection system" which can solve the problems of the conventional projection systems based on a single screen has been proposed. The "multi-projection system" refers to a technology in which a plurality of projection surfaces are arranged around audience seats such that synchronized images are reproduced on the plurality of projection surfaces, thus providing audiences with the three-dimensional effect and immersion.

Meanwhile, it is necessary to change the viewing direction of audiences depending on the images projected on the plurality of projection surfaces so as to maximize the 3D effect and immersion that audiences feel from the "multi-projection system". However, there is no technology for changing the viewing direction.

Therefore, there is a need to develop a technology that can change the viewing direction of audiences depending on the images projection on the plurality of projection surfaces, thus maximizing the viewing effect of the "multi-projection system".

DISCLOSURE OF INVENTION

Technical Problem

An object of the present invention is to provide a multi-projection system and method, which can change the viewing direction of audiences depending on images projected on a plurality of projection surfaces, thus maximizing the viewing effect of the multi-projection system.

Solution to Problem

To achieve the above object, a multi-projection system in accordance with an embodiment of the present invention may comprise: a plurality of projection surfaces installed in a single theater; and an audience seat whose direction is changed depending on images projected on the plurality of projection surfaces.

Here, the direction of the audience seat may be changed toward a specific projection surface among the plurality of projection surfaces by a rotational motion.

The audience seat may perform the rotational motion about three rotational axes perpendicular to each other, and the direction of the audience seat may be changed toward each projection surface by the rotational motion.

The audience seat may move to be close to or far from the specific projection surface.

When an object in the image moves between the projection surfaces, the direction of the audience seat may be changed toward a projection surface on which the object in the image is present.

When a specific event in the image occurs only in an image on a specific projection surface among the plurality of projection surfaces, the direction of the audience seat may be changed toward the specific projection surface.

The multi-projection system in accordance with an embodiment of the present invention may further comprise a seat control device for controlling the operation of the audience seat.

One or more audience seats may be installed in the theater, and the seat control device may integratedly control the one or more audience seats.

The seat control device may transmit a control signal to the audience seat, and the control signal may include time information and operation information.

The operation of the audience seat may be synchronized with the images, projected on the plurality of projection surfaces, based on the time information.

The operation information may include speed information, and the seat control device may change the speed information depending on the images projected on the plurality of projection surfaces.

The plurality of projection surfaces may be arranged to surround the audience seat.

The plurality of projection surfaces may reproduce synchronized images as a whole.

The audience seat may comprise a user input unit, and the direction of the audience seat may be changed depending on information input through the user input unit.

The audience seat may comprise an additional effect device which implements an additional effect that matches the images projected on the plurality of projection surfaces.

The additional effect may include a vibration effect, a sound effect, a wind effect, a smell effect, a fog effect, a temperature change effect, a laser effect, a light effect, a bubble effect, a tickling effect, an air shot effect, a water shot effect, etc.

When an object in the image moves between the projection surfaces, the direction of the audience seat may be changed toward a projection surface on which the object in the image is present, and the audience seat may implement an additional effect associated with the object in the image.

When a specific event in the image occurs only in an image on a specific projection surface among the plurality of projection surfaces, the direction of the audience seat may be changed toward the specific projection surface, and the audience seat may implement an additional effect associated with the specific event.

Meanwhile, to achieve the above object, a multi-projection method in accordance with an embodiment of the present invention may comprise the steps of: (a) allowing multi-projection images to be projected on a plurality of projection surfaces installed in a single theater; (b) allowing the images projected on the plurality of projection surfaces to change; and (c) allowing the direction of an audience seat installed in the theater to be changed as the images projected on the plurality of projection surfaces change.

Advantageous Effects of Invention

The present invention configures conventional audience seat, which are fixedly installed or configured to vibrate only, to be direction-changeable, thus freely changing the viewing direction of audiences on a plurality of projection surfaces.

Moreover, when images projected on the plurality of projection surfaces change, the present invention can change the viewing direction to a direction that matches the change in the images and can maximize the immersion of audiences. Further, in a unique image configuration of the multi-projection system (e.g., a movement of an object in the image between the projection surfaces, an occurrence of a specific event in the image on a specific projection surface among the plurality of projection surface, etc.), the present invention can change the viewing direction to a direction that can maximize the immersion of audiences.

Furthermore, according to the present invention, the audiences need not change their bodies or faces according to various image configurations, which allows the audiences to conveniently view the images reproduced three-dimensionally on the plurality of projection surfaces.

In addition, the present invention can change the direction of the audience seat in response to a user s input, thus changing the viewing direction toward a specific projection surface that the audience wants among the plurality of projection surfaces. Therefore, the audiences can freely change the viewing direction in the images of various viewpoints provided on the plurality of projection surfaces and can feel as if they are actually present in the scene represented by the images.

Additionally, the present invention can change the viewing direction depending on the images projected on the plurality of projection surfaces and, at the same time, provide additional effects, such as scent, wind, temperature, etc., which match the images. Therefore, the present invention can maximize the immersion and reality that the audiences can feel during watching through the change in the viewing direction and the provided additional effects.

MODE FOR THE INVENTION

Hereinafter, a multi-projection system and method according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Next, a multi-projection system according to the present invention will be described with reference to FIGS. 1 to 6.

Figure 1:
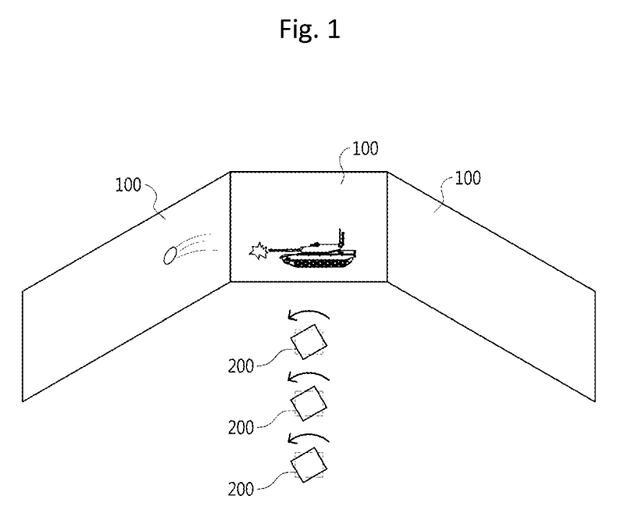
FIGS. 1 and 2 are diagrams showing the configuration of a multi-projection system in accordance with an embodiment of the present invention.
Figure 2:
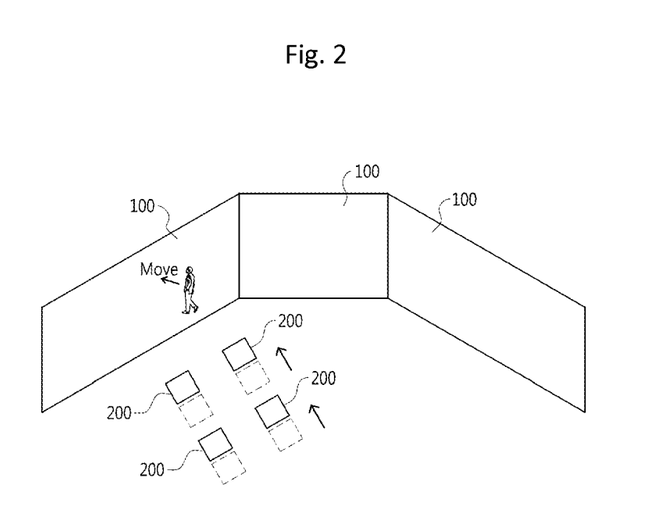

Referring to FIGS. 1 and 2, the multi-projection system in accordance with an embodiment of the present invention may comprises a plurality of projection surfaces 100 which are installed in a single theater and an audience seat 200 whose direction can change depending on images projected on the plurality of projection surfaces.

The plurality of projection surfaces 100 are provided for multi-projection in a single theater. A plurality of images may be reproduced on the plurality of projection surfaces 100. Here, the images reproduced on the plurality of projection surfaces 100 may be synchronized with each other based on a synchronization signal. In this case, it is preferable that the images reproduced on the plurality of projection surfaces 100 generally create a unified image. In detail, while different images may be reproduced on the respective projection surfaces 100, it is preferable that the different images are associated with each other to create a unified image when viewed over the entire projection surface.

Of course, according to the embodiments, separate images (e.g., a main image, a descriptive image for the main image, etc.) may be projected on the plurality of projection surfaces 100.

Moreover, the plurality of projection surfaces 100 may be arranged so as not to be parallel to each other. According to the prior art, an image is projected only on a screen placed in front of a theater such that an audience watches the image reproduced on the two-dimensional screen or a 3D technology is applied to the image itself reproduced on a plane. On the contrary, according to the present invention, the plurality of projection surfaces 100 are three-dimensionally arranged so as not to be parallel to each other, and thus it is possible to provide the audience with a three-dimensional image with high three-dimensional effect and immersion through the three-dimensionally arranged plurality of projection surfaces 100 without applying the 3D technology to the image itself.

Moreover, it is preferable that the plurality of projection surfaces 100 are arranged to surround the audience seats in the theater. Therefore, the audiences can feel as if they are in a space created by the unified image reproduced on the plurality of projection surfaces 100, and thus the three-dimensional effect, immersion, and virtual reality that the audiences feel can be maximized.

Furthermore, the angle between the projection surfaces 100 is not limited to a specific angle, and the plurality of projection surfaces 100 may be arranged at various angles as long as the audiences can feel the three-dimensional effect.

In addition, the plurality of projection surfaces 100 may be arranged to be adjacent to each other or to be spaced from each other and, even in this case, it is preferable that the plurality of projection surfaces 100 are arranged to surround the audience seats.

Figure 4:
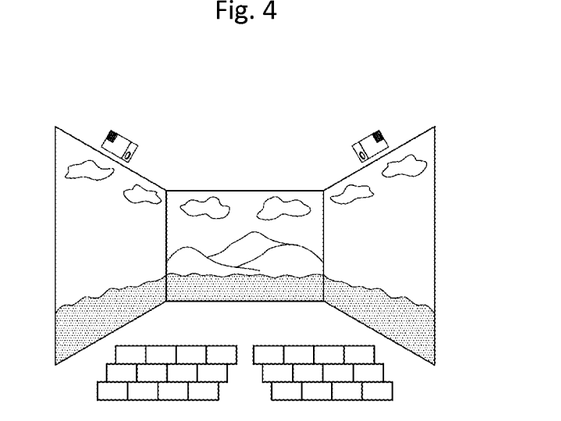
FIGS. 4 to 6 are diagrams showing examples of a plurality of projection surfaces.
Figure 5:
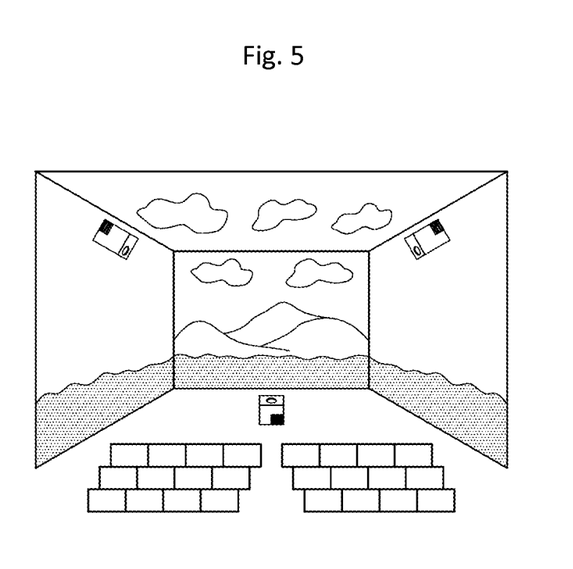
Figure 6:
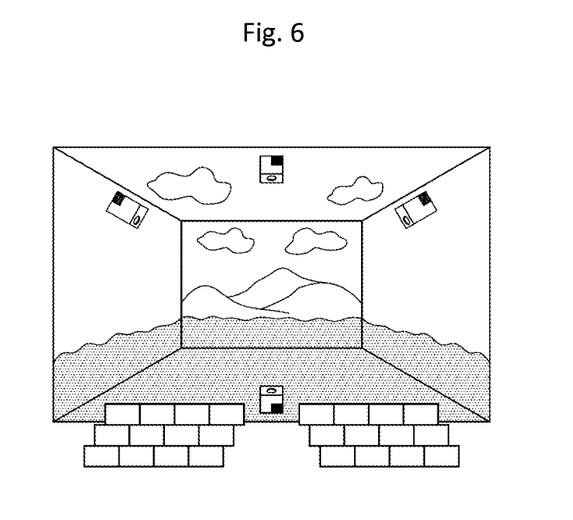

FIG. 4 is a diagram showing an example in which the plurality of projection surfaces 100 are arranged on the front, left, and right sides with respect to the audience seats 200, FIG. 5 is a diagram showing an example in which the plurality of projection surfaces 100 are arranged on the front, left, right, and top sides with respect to the audience seats 200, and FIG. 6 is a diagram showing an example in which the plurality of projection surfaces 100 are arranged on the front, left, right, top, and bottom sides with respect to the audience seats 200.

Moreover, the plurality of projection surfaces 100 may be composed of various types of projection surfaces 100 such as screens, walls, etc. and may comprise different types of projection surfaces 100 at the same time.

Meanwhile, the images reproduced on the plurality of projection surfaces 100 may be projected by two or more projection devices installed in the theater, and these two or more projection devices may be implemented by including an optical system and a heating unit in various manners. For example, the projection devices may be implemented in various ways, such as by using a cathode ray tube (CRT), using a liquid crystal display (LCD), by digital light processing (DLP) using a digital micromirror device (DMD) chip, by liquid crystal on silicon (LCoS), etc. Moreover, the two or more projection devices may be electrically connected to an image management device and then integratedly controlled by the image management device, and the images can be projected on the plurality of projection surfaces 100 under the control of the image management device.

The audience seats 200 are configured to allow audiences to easily view the images reproduced on the plurality of projection surfaces 100.

It is preferable that these audience seats 200 are arranged to be surrounded by the plurality of projection surfaces 100 in the theater, because this arrangement allows the audiences sitting on the audience seats 200 to feed as if they are in a space created by the images, thus maximizing the reality and immersion that the audiences feel.

Moreover, it is preferable that the audience seats 200 movably installed, not fixedly, while being surrounded by the plurality of projection surfaces 100. In the conventional projection system, the image is provided only on a single projection surface 100 arranged in front thereof, and thus the audience seats 200 are fixed toward the single projection surface 100. However, in the present invention, the images are provided on the plurality of the projection surfaces 100 that surround the audience seats 200, and thus it is preferable that the audience seat 200 are movably provided. Specifically, it is preferable that the audience seats 200 are configured to freely change their direction and move between the projection surfaces 100.

Referring to FIG. 1, the direction of the audience seat 200 may be changed by a rotational motion. In detail, the direction of the audience seat 200 can be changed toward a specific projection surface 100 (such as the front, left, right, floor, ceiling, etc.) among the plurality of projection surfaces 100, thus also changing the viewing direction of the audiences. For example, the direction of the audience seat 200 may be changed in synchronized with a movement of an object in the image, an occurrence of an event in the image, or a change in environment in the image, which maximizes the three-dimensional effect and reality that the audiences feel, thus allowing the audiences to conveniently view the images projected on the plurality of projection surfaces 100. Moreover, the speed of the rotational motion may be changed depending on the image. For example, in a landscape scene, a non-dynamic scene, etc, the rotational motion may be performed at a low speed, and in a chase scene, a horror scene, etc., the rotational motion may be performed at a higher speed.

Referring to FIG. 2, the audience seats 200 may move to be close to or far from the specific projection surface 100. Specifically, the audience seat 200 may be configured to perform a linear motion in various axial directions. This linear motion can further maximize the reality and immersion that the audiences feel. Meanwhile, it is preferable that the linear motion of the audience seat 200 is performed in synchronization with the images projected on the plurality of projection surfaces 100, like the rotational motion. For example, when an object in the image moves far from a specific projection surface 100 or comes out of the projection surface 100, the audience seat 200 may perform the linear motion to be close to or far from the projection surface 100 in synchronization with the movement of the corresponding object. Moreover, when a specific event (e.g., explosion) occurs in the image on the specific projection surface 100, the audience seat 200 may perform the linear motion to be close to or far from the specific projection surface 100 in response to the occurrence of the corresponding explosion and may perform the linear motion in response to other image changes.

Meanwhile, the audience seat 200 may also perform a motion of leaning back. Therefore, this motion can naturally change the viewing direction of the audiences toward the projection surface provided on the top side (e.g., ceiling surface) (for reference, the operation of changing the viewing direction of the audiences toward the projection surface provided on the top side (e.g., ceiling surface) may be achieved by a three-dimensional rotational motion of the audience seat 200, but may also be achieved by the motion of leaning back).

The above-described audience seat 200 may be implemented in various ways so as to perform the linear motion or rotational motion.

In particular, it is preferable that the audience seat 200 is configured to perform the rotational motion about various rotational axes, which are present three-dimensionally, so as to freely change the direction between the projection surfaces 100 installed in the theater. Moreover, it is preferable that the audience seat 200 is configured to perform the linear motion in various directions so as to be freely close to or far from all of the projection surfaces 100.

Figure 3:
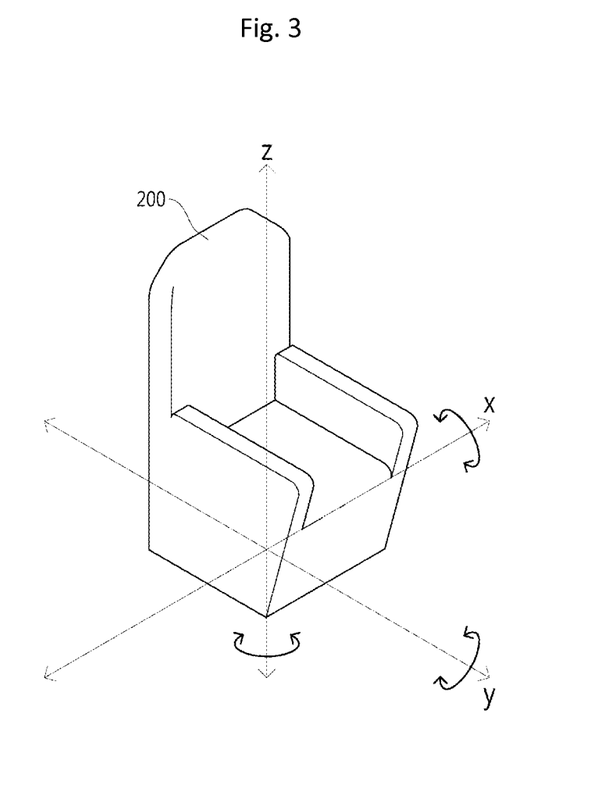
FIG. 3 is a diagram showing an example of the operation of an audience seat in accordance with an embodiment of the present invention.

For example, referring to FIG. 3, the audience seat 200 may be configured to perform the rotational motion about three axes (x, y, and z) perpendicular to each other. Moreover, the rotational motions about the respective axes may be performed at the same time (e.g., the rotational motions about x and y axes may be performed at the same time, and the rotational motions about y and z axes may be performed at the same time). Meanwhile, these rotational motions may be implemented by various mechanisms, such as by a using universal join, for example (For reference, the operation of changing the direction in this example is performed as follows: the direction of the audience seat 200 may be changed between the left, front, and right projection surfaces by the rotation about z axis and may be changed toward the top side (e.g., ceiling surface) by the rotation about x axis. Moreover, the rotational motions about the respective axes may be performed at the same time to implement a dynamic change in the direction).

Moreover, the audience seat 200 may be configured to freely rotate about any rotational axes that are present three-dimensionally. For example, the audience seat 200 may be connected to the floor by means of a ball joint and may be configured to rotate about various rotational axes, which are present three-dimensionally, by means of the ball joint.

Meanwhile, the audience seat 200 may be configured to perform the linear direction in various directions in three-dimensional space. The linear motion of the audience seat may be implemented by various mechanisms such as casters/brake mechanism, rail mechanism, support shaft height adjustment mechanism, etc.

Next, the operation of changing the direction of the audience seats 200 will be described with reference to FIGS. 7 and 9.

As briefly described above, the operation of changing the direction of the audience seats 200 may be performed in synchronization with the images projected on the plurality of projection surfaces 100. FIGS. 7 to 9, which will be described below, shows several examples of the operation of changing the direction of the audience seats 200, and the operation of changing the direction of the audience seats 200 is not limited by the following examples.

Figure 7:
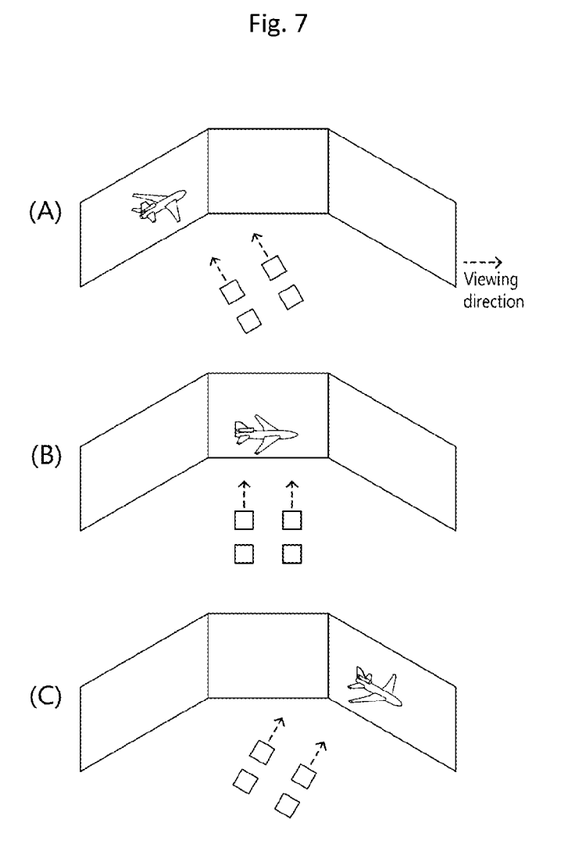
FIGS. 7 to 9 are conceptual diagrams showing the change in the viewing direction that can be implemented by a multi-projection system in accordance with an embodiment of the present invention.
Figure 8:
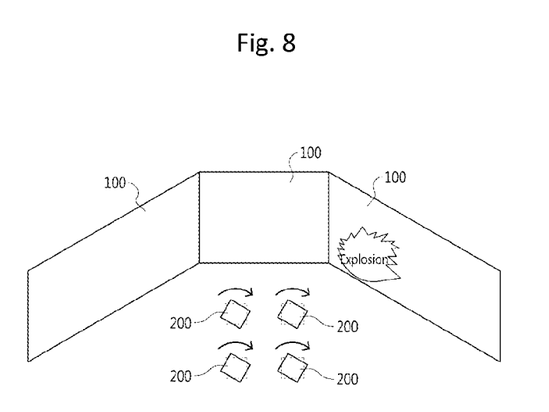

Referring to FIG. 7, when an object in the image moves between the projection surfaces, the direction of the audience seats 200 may be changed toward a projection surface on which the object in the image is present. Specifically, when an object (e.g., aircraft) in the image sequentially moves from the left projection surface (A) to the middle projection surface (B) and to the right projection surface (C) as shown in FIG. 7, the direction of the audience seats 200 may be sequentially changed from the left projection surface (A) to the middle projection surface (B) and to the right projection surface (C) in synchronization with the movement of the object. Therefore, the audiences can naturally change their viewpoints through the direction change of the audience seats 200 in synchronization with the movement of the object in the image, thus improving the immersion and three-dimensional effect that the audiences feel from the images.

Referring to FIG. 8, when a specific event in the image occurs only in an image on a specific projection surface (e.g., the front, left, or right side, ceiling, floor, etc.) among the plurality of projection surfaces 100, the direction of the audience seats 200 may be changed toward the specific projection surface. Specifically, when an event (e.g., explosion, appearance of a character, etc.) in the image occurs on the right projection surface as shown in FIG. 8, the direction of the audience seats 200 may be changed toward the right projection surface. Therefore, the audiences can naturally change their viewpoints through the direction change of the audience seats 200 in synchronization with the occurrence of the event in the image, thus improving the immersion and three-dimensional effect that the audiences feel from the images.

Figure 9:
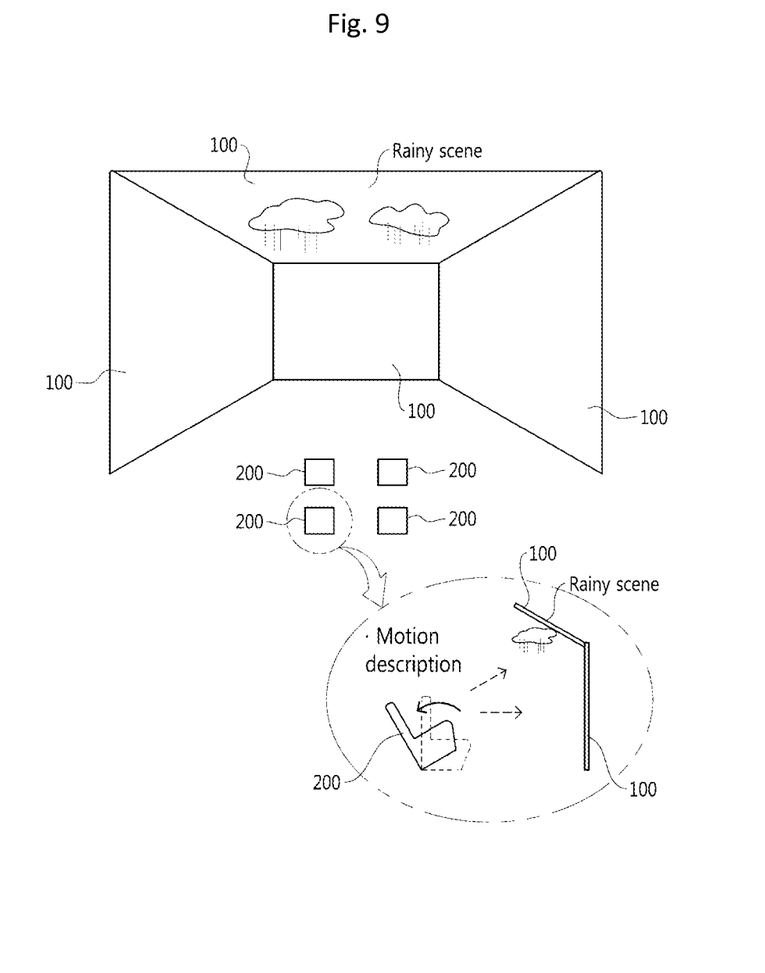

Referring to FIG. 9, when a natural phenomenon (e.g., weather change, sunrise, sunset, aurora, meteorite, meteor, etc.) in the image changes, the direction of the audience seats 200 may be changed toward the projection surface provided on the top side. Specifically, when a natural phenomenon (e.g., weather) in the image changes as shown in FIG. 9, the direction of the audience seats 200 may be changed toward the projection surface on the top side such that the audiences can realistically experience the change of the natural phenomenon. Therefore, the audiences can naturally change their viewpoints through the direction change of the audience seats 200 in synchronization with the change of the natural phenomenon in the image, thus improving the immersion and three-dimensional effect that the audiences feel from the images.

For reference, the operation of directing the audience seats 200 toward the top side (e.g., ceiling surface) may be achieved by the three-dimensional rotational motion or by the motion of leaning back as mentioned above.

Meanwhile, the motion of the audience seat 200 may be automatically controlled by an electronic device or manually controlled by a user s input or may be controlled both automatically and manually.

First, the automatic control will be described. The rotational or linear motion of the audience seat 200 may be automatically controlled by an electronic device connected to the audience seat 200. Here, the electronic device may be a server externally connected to the audience seat 200 or an arithmetic unit installed in the audience seat 200. The electronic device controls the motion of the audience seat 200 based on control information. The control information may include time information for synchronization with the images projected on the plurality of projection surfaces and operation information about detailed motions (such as linear and rotational motions) to be performed at a corresponding time. Therefore, the electronic device can synchronize the motions of the audience seats 200 with the images projected on the plurality of projection surfaces 100 based on the control information, thus maximizing the three-dimensional effect and immersion of the audiences.

Next, the manual control will be described. The audience seat 200 may comprise a user input unit for receiving an operation command from a user to be manually controlled by the user input unit. Here, the user input unit may comprise an input device such as a button, a tough panel, etc., through which the audience s command is input, and the audience seat 200 performs the linear or rotational motion in response to the input command. Therefore, the audiences can freely change the viewing direction between the projection surfaces by the manual control and can feel as if they are actually present in the scene represented by the images. Meanwhile, the audience may control his or her seat so as not to move (such as linear motion, rotational motion, etc.) by manipulating the input unit, if he or she does not want the motion of the audience seat 200. Therefore, the audience can operate the audience seat 200 according to his or her intention.

Lastly, the audience seat 200 may be configured to be controlled both automatically and manually. In this case, it is preferable that the audience seat 200 is basically controlled automatically by the electronic device connected thereto and switched to a manual control mode in response to the user s selection during the automatic control.

Next, a multi-projection system in accordance with another embodiment of the present invention will be described with reference to FIG. 10.

Figure 10:
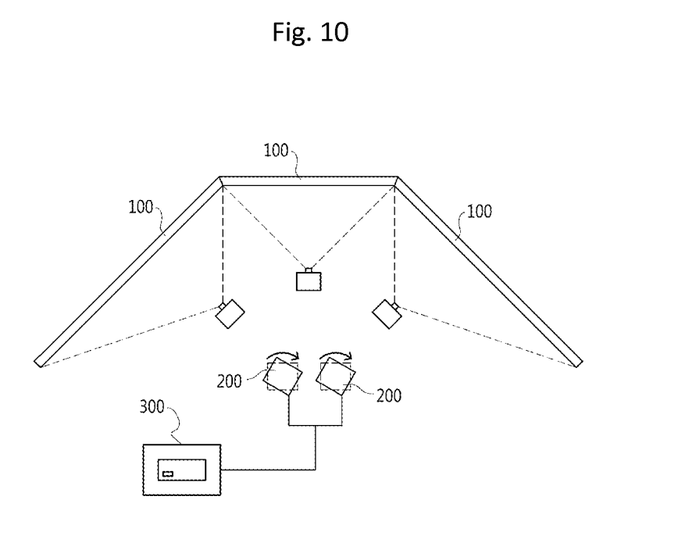
FIG. 10 is a diagram showing the configuration of a multi-projection system in accordance with another embodiment of the present invention.

Referring to FIG. 10, the multi-projection system in accordance with another embodiment of the present invention may comprise a seat control device 300 for controlling the operation of the audience seats 200.

Here, it is preferable that two or more audience seats 200 are installed in the theater and the seat control device 300 integratedly controls the two or more audience seats 200.

The seat control device 300 is a device that controls the two or more audience seats 200. The seat control device 300 may be electrically connected to the two or more audience seats 200 to control the operation of the audience seats 200. Moreover, the seat control device 300 may preferably be connected in parallel to the two or more audience seats 200 to control the respective audience seats 200 either simultaneously or individually. Meanwhile, the seat control device 300 may be connected to the two or more audience seats 200 in a wired or wireless manner.

Moreover, the seat control device 300 may transmit a control signal to the audience seats 200 to control the rotational or linear motion of the audience seats 200. The control signal may include time information data and operation information data. The time information data may include time point information at which the audience seats 200 are to operate, and the operation information data may include detailed operation information (on the rotational motion or linear motion). Therefore, two or more audience seats 200 can be synchronized with the images, projected on the plurality of projection surfaces 100, based on the time information data and can perform an appropriate motion (such as rotational motion or linear motion) that can match the multi-projection images. Meanwhile, it is preferable that the time information data is generated based on time codes of multi-projection image contents (such as digital cinema package, digital screen advertising, etc.) such that the two or more audience seats 200 can be easily synchronized with the multi-projection image contents.

Furthermore, the seat control device 300 may also control the movement speed of the audience seats 200. Specifically, the seat control device 300 may control the movement speed of the audience seats 200 based on the operation information data including movement speed information such that the audience seats 200 can operate at different speeds depending on the type of the image. For example, in a landscape scene, the seat control device 300 may control the motion (such as rotational motion or linear motion) of the audience seats 200 at a low speed, and in a chase scene, a horror scene, etc., the motion of the audience seats 200 may be performed at a higher speed.

Meanwhile, the seat control device 300 may be implemented with various electronic devices. For example, the seat control device 300 may be implemented in a single server or in such a manner that two or more servers are interconnected. Moreover, the seat control device 300 may be implemented in such a manner that a server and other electronic devices are interconnected or implemented in arithmetic units other than the server.

Moreover, the seat control device 300 may be configured in the form of an integrated management device which is combined with an image management device which integratedly controls the two or more projection devices. Specifically, an integrated management device, which can perform all of the functions of the image management device and the seat control device 300, may be configured (preferably, in the form of a server) to control the projection devices and the audience seats 200. Here, the integrated management device may synchronize the two or more projection devices with the two or more audience seats 200 based on a common synchronization signal and may be connected in parallel to the respective devices to control the respective devices either simultaneously or individually.

Furthermore, the audience seat 200 may comprise a user input unit and may be switched to a manual mode in response to a user s selection. When the audience seat 200 is switched to the manual mode, the audience seat 200 is not controlled by the seat control device 300 but freely performs the rotational or linear motion in response to a command input through the user input unit.

Meanwhile, when the seat control device 300 is connected to the image management device to constitute an integrated management device, the integrated management device can correct image contents which are to be projected by the two or more projection devices and allow the corrected image contents to be projected on the plurality of projection surfaces 100 through the two or more projection devices.

Here, the integrated management device may correct the image contents based on information on the two or more projection devices or information on the plurality of projection surfaces 100. In this case, it is preferable that the correction of the image contents is performed so as to offset the difference in properties (brightness, color, image quality, material, structure, etc.) of the plurality of projection surfaces 100 or the difference in properties (lamp output, resolution, etc.) of the two or more projection devices (so as to create synchronized and unified images on the plurality of projection surfaces).

First, the correction of the image contents performed by the integrated management device based on the information on the plurality of projection surfaces 100 will now be described. The integrated management device may correct the image contents based on the information on the properties of the plurality of projection surfaces 100. Specifically, the integrated management device may correct the image contents so as to offset the difference in properties based on the information on the difference in properties (such as a difference in chromaticity, a difference in brightness, a difference in reflectivity, etc.) between the projection surfaces 100.

Representatively, the correction based on the information on the difference in chromaticity between the projection surfaces 100 will now be described (the process which will be described below can, of course, be applied to the correction based on the difference in brightness, difference in reflectivity, etc.). First, the integrated management device may calculate the information on the difference in chromaticity between the projection surfaces 100 based on chromaticity information of the respective projection surfaces 100. In detail, the integrated management device may set a single reference projection surface and then calculate information on a relative difference in chromaticity of each projection surface. For example, the information on the relative difference in chromaticity is calculated in such a manner that "projection surface A has a red (R) color level 50 higher than that of the reference projection surface, a green (G) color level 40 higher than that of the reference projection surface, and a blue (B) color level the same as that of the reference projection surface". After the information on the difference in chromaticity of the respective projection surfaces is calculated in this manner, the images may be corrected based on the calculated information in such a manner so as to "reduce the R color level of the image projected on projection surface A by 50, reduce the G color level by 40, and maintain the B color level", for example. Therefore, the difference in chromaticity of the projection surfaces can be offset.

Meanwhile, the analysis of the difference in properties of the plurality of projection surfaces 100 may be performed in various ways other than the method of setting the reference projection surface. For example, it is possible to calculate representative values (e.g., mean values, median values, mode values, etc.) for the properties of the plurality of projection surfaces 100 and then analyze the relative difference in properties based on the calculated representative values.

Moreover, the correction of the image contents performed by the integrated management device based on the information on the two or more projection devices will now be described. The integrated management device may correct the image contents based on the information on the properties of the projection devices. Specifically, the integrated management device may correct the image contents so as to offset the difference in properties based on the information on the difference in properties (such as a difference in contrast, difference in brightness, difference in resolution, difference in image quality due to physical distance, etc.) between the two or more projection devices.

Representatively, the correction based on the information on the difference in brightness between the two or more projection devices will now be described (the process which will be described below can, of course, be applied to the correction based on the difference in contrast, difference in resolution, difference in image quality etc.). First, the integrated management device may offset the difference in brightness between the projection devices by correction. For example, if it is assumed that the brightness of projection device A is 500 ANSI Lumens, the brightness of projection device B is 1000 ANSI Lumens, and the brightness of projection device C is 1500 ANSI Lumens, this difference in brightness may be offset by the image correction. In detail, the brightness ratio of the images projected by projection devices A, B, and C is corrected to 3:2:1, thus offsetting the heterogeneity of the images which may occur due to the difference in brightness between the devices.

Meanwhile, the multi-projection system in accordance with still another embodiment of the present invention may further comprise an additional effect device which is installed in the audience seat 200 to implement an additional effect that matches the images projected on the plurality of projection surfaces 100.

The additional effect device is a device for implementing the additional effect other than the images projected on the plurality of projection surfaces 100. Specifically, the additional effect device is a device that adds an effect of increasing the visual reality or adds an effect that can be perceived by other senses than sight so as to increase the immersion and reality that the audiences can feel while watching multi-projection images. The additional effects that can be provided by the additional effect device may include a sound effect, a wind effect, a smell effect, a fog effect, a temperature change effect, a laser effect, a light effect, a bubble effect, a vibration effect, a tickling effect, etc. as well as various effects associated with the five senses of human. Therefore, the additional effect device may comprise various devices such as a speaker, an air blower, a fragrance diffuser, a fog machine, a heater, a cooler, a laser device, a bubble generator, an LED, an air shot (a face air shot, a side air shot, etc.), a water shot, a tickler (a butt ticker, a leg ticker, etc.), a butt kicker, a vibration device, etc. which can stimulate the five senses of human (For reference, the air shot is a device that injects air to the audience sitting on the audience seat 200 through an injection nozzle, the water shot is a device that injects water to the audience through an injection nozzle, and the tickler or kicker is a device that tickles the audience by pricking or striking with a predetermined intensity or at a predetermined cycle).

Moreover, the additional effect system may preferably be controlled in conjunction with the linear motion or rotational motion of the audience seat 200, specifically in conjunction with the control signal transmitted from the seat control device 300. Therefore, in this case, the control signal transmitted from the seat control device 300 may include both operation information data for the motion (such as rotational motion or linear motion) of the audience seats 200 and operation information data for the operation of the additional effect device, and these operation information data included in the control signal may match the time information data.

Meanwhile, the multi-projection system may further comprise additional effect devices, which are installed in other spaces in the theater, other than the additional effect device installed in the audience seat 200. For example, the multi-projection system may further comprises additional effect devices installed in various locations of the theater, such as the space between the audience seats 200 and the projection surfaces 100, the periphery of the plurality of projection surfaces, etc. Therefore, it is possible to implement dual additional effect devices through the additional effect devices installed in the audience seats 200 and the additional effect devices further installed in the theater, thus further maximizing the reality and immersion that the audiences feel.

The above-described audience seat 200 including the additional effect device may perform the motion (such as rotational motion or linear motion) in synchronization with the images projected on the plurality of projection surfaces 100 or implement an additional effect that matches the images. Moreover, the audience seat 200 may implement the motion operation (such as rotational motion or linear motion) and the additional effect at the same time.

For example, when an object in the image moves between the projection surfaces, the direction of the audience seat 200 may be changed toward a projection surface on which the object in the image is present, and the additional effect associated with the object in the image may be implemented at the same time. Referring to FIG. 7, when an object (e.g., aircraft) in the image moves from the left projection surface (A) to the middle projection surface (B) and to the right projection surface (C), the viewing direction of the audience seat 200 may be changed by the rotational motion and, at the same time, the additional effect associated with the object may be implemented (e.g., wind generated when the aircraft flies is provided by the air shot).

Moreover, when a specific event in the image occurs only on a specific projection surface among the plurality of projection surfaces, the direction of the audience seat 200 may be changed toward the specific projection surface, and an additional effect associated with the specific event may be implemented. Referring to FIG. 8, when an event (e.g., explosion) occurs in the image on the right projection surface, the audience seat 200 may perform the rotational motion toward the right projection surface and, at the same time, implement an additional effect associated with the event (e.g., temperature rise due to the explosion is implemented by a heater, a smoke generation is implemented by a fog machine, etc.).

Next, a multi-projection method in accordance with an embodiment of the present invention will be described with reference to FIG. 11.

Figure 11:
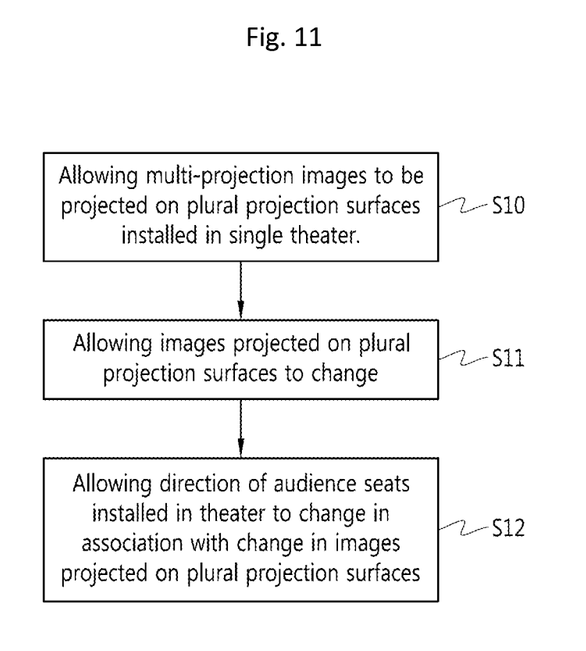
FIG. 11 is a flowchart showing a multi-projection method in accordance with an embodiment of the present invention.

Referring to FIG. 11, the multi-projection method in accordance with an embodiment of the present invention may comprise the step (S10) of allowing multi-projection images to be projected on a plurality of projection surfaces installed in a single theater.

After step S10, the images projected on the plurality of projection surfaces are to change (S11).

Here, the change in the images may include various changes such as a movement of an object in the image between the projection surfaces, an occurrence of a specific event in the image on a specific projection surface among the plurality of projection surface, a change in environment such as a natural phenomenon in the image, etc.

When the images projected on the plurality of projection surfaces have changed in step S11, the direction of the audience seats changes in synchronization with the change in the images (S12).

Here, the audience seats perform a rotational motion in synchronization with the change in the images, and thus the direction of the audience seats changes. Moreover, the audience seats may be configured to provide various additional effects in conjunction with the rotational motion.

Meanwhile, the multi-projection method may be implemented in the form of a program and then stored in a recording medium readable by an electronic device or transmitted and received through a communication network. Moreover, the multi-projection method may be implemented in the form of a program and then temporarily or permanently stored in various electronic devices.

Furthermore, the above-described multi-projection method according to the present invention may have substantially the same features as the multi-projection system according to the present invention, while they are in different categories. Thus, the above-described features associated with the multi-projection system may be easily adapted and applied to the multi-projection method.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A multi-projection system, comprising:
   a plurality of projection surfaces installed in a single theater, the plurality of projection surfaces including a first projection surface and a second projection surface;
   an audience seat configured to change a direction thereof; and
   a seat control device configured to transmit a control signal to the audience seat to control the audience seat to change the direction depending on images projected on the plurality of projection surfaces,
   wherein, the control signal includes
      time information, which an operation of the audience seat is synchronized to, for controlling the audience seat depending on the images, and
      operation information on an operation to be performed by the audience seat at a corresponding time,
   wherein the operation information includes speed information,
   wherein the audience seat is configured to change the direction of the audience seat at different speeds corresponding to the speed information, and
   wherein, when an object in a first image projected on the first projection surface moves into a second image projected on the second projection surface, the seat control device is configured to control the audience seat to change the direction toward the second projection surface.

2. The multi-projection system of claim 1, wherein the audience seat is configured to change the direction by a rotational motion.

3. The multi-projection system of claim 2, wherein the audience seat is configured to perform the rotational motion about rotational axes that are present three-dimensionally.

4. The multi-projection system of claim 2, wherein the audience seat is configured to move, by a linear motion, toward or away from the second projection surface according to a movement of the object.

5. A multi-projection system, comprising:
   a plurality of projection surfaces installed in a single theater;
   an audience seat whose direction is changed depending on images projected on the plurality of projection surfaces; and
   a seat control device configured to transmit a control signal to the audience seat to control the audience seat to change the direction depending on images projected on the plurality of projection surfaces,
   wherein the control signal includes time information, which an operation of the audience seat is synchronized to, for controlling the audience seat depending on the images, and operation information on an operation to be performed by the audience seat at a corresponding time,
   wherein the operation information includes speed information,
   wherein the audience seat is configured to change the direction of the audience seat at different speeds corresponding to the speed information, and
   wherein when a specific event occurs only in an image on a specific projection surface among the plurality of projection surfaces, the direction of the audience seat is changed toward the specific projection surface.

6. The multi-projection system of claim 5, wherein the audience seat is configured to move, by a linear motion, toward or away from the projection surface where the image is projected depending on a movement of the object.

7. The multi-projection system of claim 1, further comprising:
   an additional audience seat installed in the theater, and
   the seat control device is configured to control the installed audience seats to change directions of the installed audience seats toward the second projection surface simultaneously.

8. The multi-projection system of claim 1, wherein the plurality of projection surfaces is arranged to surround the audience seat.

9. The multi-projection system of claim 1, wherein the images projected on the plurality of projection surfaces are parts of a synchronized image as a whole.

10. The multi-projection system of claim 1, wherein the audience seat comprises a user input unit configured to control the direction of the audience seat by a user.

11. The multi-projection system of claim 1, wherein the audience seat comprises an additional effect device configured to perform at least one of a vibration effect, a tickling effect, an air shot effect, and a water shot effect in synchronization with the images.

12. The multi-projection system of claim 1,
   wherein the audience seat comprises an additional effect device configured to perform at least one effect of a vibration effect, a tickling effect, an air shot effect, and a water shot effect in synchronization with the images, and
   wherein, when the object moves between the images projected on the plurality of the projection surfaces, the seat control device is configured to control the audience seat to perform the at least one effect associated with the object.

13. The multi-projection system of claim 5,
   wherein the audience seat comprises an additional effect device configured to perform at least one effect of a vibration effect, a tickling effect, an air shot effect, and a water shot effect in synchronization with the images, and
   wherein the audience seat is configured to perform the at least one effect associated with the predetermined event.

14. A multi-projection method performed by a multi-projection system, the method comprising:

projecting multiple images on a plurality of projection surface installed in a single theater, respectively, the plurality of projection surfaces including a first projection surface and a second projection surface; and changing a direction of the plurality of audience seats installed in the single theater depending on the projected images by transmitting a control signal to each of the audience seats, wherein the control signal includes time information, which an operation of the audience seat is synchronized to, for controlling the audience seat depending on the images, and operation information on the operation to be performed by the audience seat at a corresponding time, wherein the operation information includes speed information, wherein the direction of the audience seat is changed at different speeds corresponding to the speed information, and wherein, when an object in a first image projected on the first projection surface moves into a second image projected on the second projection surface, the direction of the plurality of audience seats is changed toward the second projection surface.

\* \* \* \* \*